United States Patent

Liao et al.

Patent Number: 5,864,529
Date of Patent: Jan. 26, 1999

[54] DISK LOADING DEVICE FOR AN OPTICAL DISK DRIVER

[75] Inventors: Cheng-Yao Liao, Taichung; Hwei-Chu Huang, Hsih Chu Hsien; Jenn-Shing Tsai, Hsih Chu, all of Taiwan

[73] Assignee: Lite-On Technology Corp., Taipei, Taiwan

[21] Appl. No.: 844,783

[22] Filed: Apr. 22, 1997

[30] Foreign Application Priority Data

Jan. 9, 1997 [TW] Taiwan ................................. 86200324

[51] Int. Cl.⁶ ........................................................ G11B 33/02
[52] U.S. Cl. .......................................... 369/77.1; 369/75.2
[58] Field of Search ............................... 369/77.1, 75.2, 369/258, 261, 262, 263, 270, 271, 77.2, 291; 360/99.06, 133

[56] References Cited

U.S. PATENT DOCUMENTS

| | | | |
|---|---|---|---|
| 4,625,304 | 11/1986 | Kanamaru et al. | 369/75.2 |
| 4,695,995 | 9/1987 | Koizumi | 369/75.2 |
| 4,707,821 | 11/1987 | Verhagen | 369/292 |
| 4,773,058 | 9/1988 | Petruchik et al. | 369/77.2 |
| 4,791,515 | 12/1988 | Tanaka et al. | 360/133 |
| 4,849,958 | 7/1989 | Douwes et al. | 369/77.2 |
| 5,014,258 | 5/1991 | Takemasa et al. | 369/178 |

FOREIGN PATENT DOCUMENTS

| | | |
|---|---|---|
| 6-111444 | 4/1994 | Japan . |
| 6-236648 | 8/1994 | Japan . |
| 8-235714 | 9/1996 | Japan . |

*Primary Examiner*—Stuart S. Levy
*Assistant Examiner*—Kenneth W. Fields
*Attorney, Agent, or Firm*—Bacon & Thomas, PLLC

[57] ABSTRACT

A tray for loading and ejecting a disk into and out of a disk drive includes a step wall structure that defines a positioning area for receiving the disk and a clamping arrangement used to hold the disk during loading and unloading when the disk drive is in a vertical position. The clamping arrangement is made up of a clamping device biased by an elastic member so as to apply a radial force to the disk and urge the disk against the step wall. The clamping device includes a flexible mortise slot that engages a pillar extending from the tray to latch the clamping device and thereby disable the clamping device when the disk drive is horizontally positioned.

2 Claims, 16 Drawing Sheets

Fig. 1 *Prior Art*

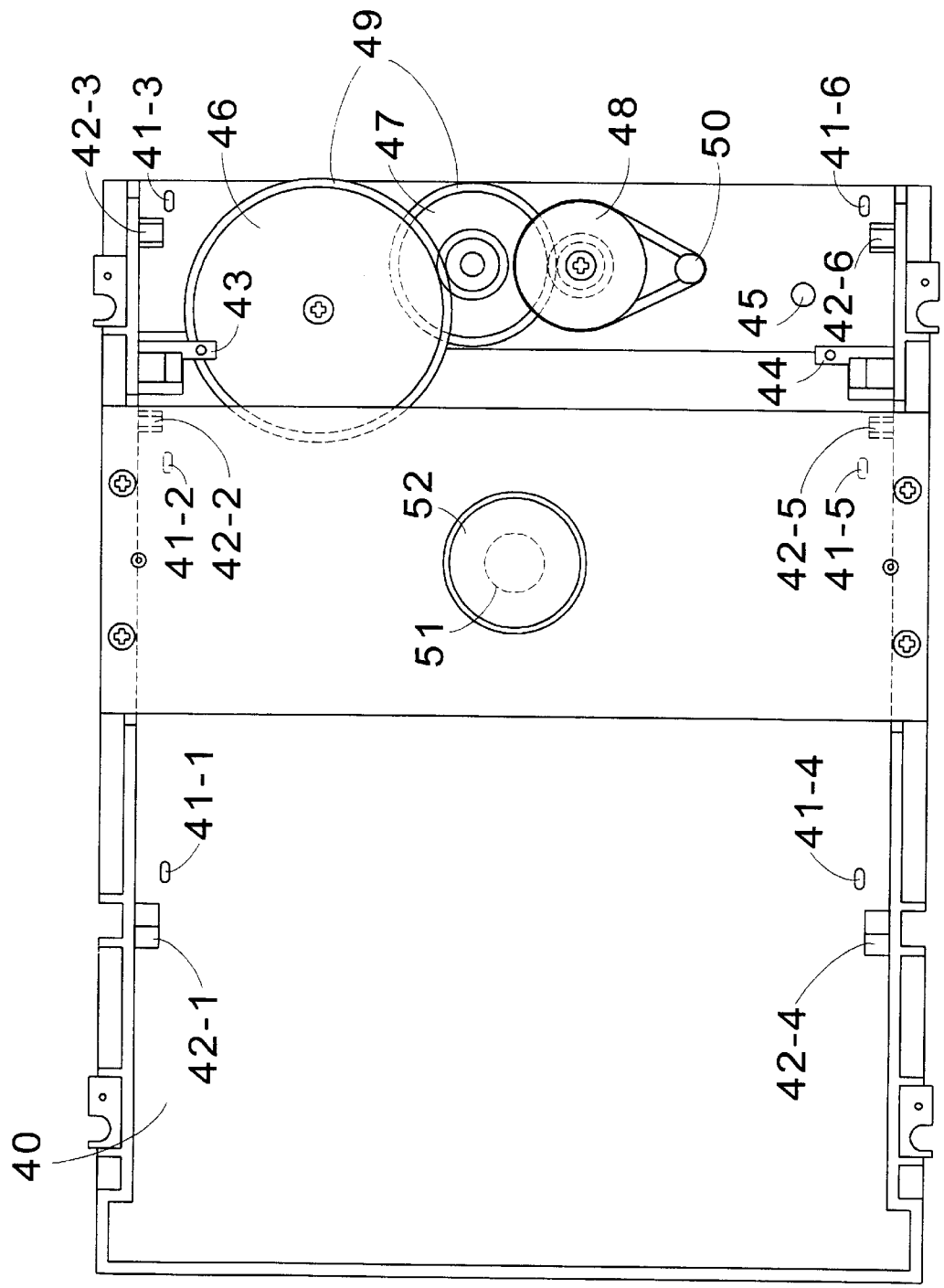
Fig. 8  *Prior Art*

DISK LOADING DEVICE FOR AN OPTICAL DISK DRIVER

BACKGROUND OF THE INVENTION

1. Field of the Invention

The present invention relates to a disk loading device, particularly, to a disk loading device for an optical disk drive which is used to vertically install the optical disk (upright in one side).

2. Description of the Prior Art

In present optical data storage systems, various mediums or an optical disk can be used to store digital information. For example, 5.25 inch optical disks are used in standard optical disk systems, which optical disks may or may not be installed within a protective caddy. If said optical disk is not fixed within a protective caddy, the optical disk must be manually loaded onto an optical disk driver's tray by an operator, and then the optical disk is carried to a predetermined position by a driving device. The optical disk loading device is well known to persons skilled in the computer field.

At the present time, as computers are used in various fields, the computer may be installed horizontally or vertically, wherein peripheral devices in the computer must be fit to operate vertically (upright in one side). In prior optical disk loading devices, a linkage optical disk tray may insert into or remove from an insertion port of the optical disk driver, and another rotary pan which allows an optical disk to rotate thereon is installed on the spindle motor of said system. Said rotary pan contains a magnet, and a clamping piece having a yoke therein arranged above the spindle. After the optical disk is positioned for reading data, the iron piece on the center of the optical disk is pulled by said magnet, thereby fixing the optical disk on the tray in the required position for rotating. However, the conventional linkage tray has no clamping force for holding the optical disks, for example, when the conventional optical disk drive, such as CD player, LD, CD-ROM, etc. are installed horizontally. During loading and unloading operation (i. e. when the optical disk is moved from the insertion port into the optical disk drive and then is loaded onto the spindle rotary pan, and when the optical disk is unloaded from the spindle rotary pan and then is pushed into the insertion port), when using the conventional optical disk drive installed horizontally, the optical disk remains on the prior linkage optical disk tray by the force of gravity and is moved parallelly with said base and horizontally toward the rotary pan position. While the optical disk drive is vertically (upright in one side) installed for use in the conventional design, the optical disk can not be supported by the tray and will be separated from the tray due to gravity, thus, the optical disk can not be loaded or unloaded using the optical disk drive.

A prior art for successfully loading and unloading optical disks when used to vertically install the optical disk driver is shown in FIG. 1. In the prior art, the linkage optical disk tray uses projecting ribs 100A on the periphery of the positioning area of an optical disk 30 for preventing the optical disk 30 from tilting. In the technology of such optical disk tray, the optical disk will be loaded into the optical disk driver installed vertically (upright in one side) so that the optical disk will not slide. However, as the optical disk is only supported by the projecting ribs 100A, it will probably vibrate during loading and unloading operations and thus may be in an unsteady condition and be inserted at a slant into the optical disk driver (not vertically). This will induce uncertainly in positioning the optical disk on the predetermined position of the rotary pan. Furthermore, if the optical disk tray has projecting ribs, regardless of how the optical disk is installed vertically (upright in one side) or horizontally, when the optical disk is located on the optical disk tray, a smaller angle is needed to transfer the rim of said optical disk inside the structure of the projecting rib. This is troublesome for an operator. Therefore, the disadvantage of the prior art is that the optical disk can not be steadily loaded into the preset position of the rotary pan.

THE PROBLEM IS SOLVED BY THE PRESENT INVENTION

Accordingly, the object of the present invention is to overcome the problem which causes unsuccessful loading and unloading of the optical disk so that the present invention may be steadily loaded into a predetermined position on the rotary pan during loading and unloading operations, and when the optical disk driver is installed horizontally, the optical disk tray of the present invention also provides as easy loading and unloading as that of the conventional art.

SUMMARY OF THE INVENTION

To solve said problem described hereinabove, when vertically installing said optical disk tray of the present invention onto the optical disk driver, a radially clamping force is applied to the optical disk to endure that the optical disk will be steadily loaded and unloaded and the optical disk is further fixed on the rotary position by the rotary pan having a magnet. When the optical disk driver is installed horizontally, the optical disk tray of the present invention may disable the radially clamping force so as to restore the convenient functions and operations provided by the conventional optical disk tray.

The primary object of the present invention is to provide an optical disk loading method so that when the optical disk driver is vertically (upright in one side) installed, the optical disk will not slide on and shift from the tray during loading and unloading operations.

Another object of the present invention is to provide a disk loading device having a radially clamping force so that during loading and unloading operations, a radially clamping force can be applied to the optical disk and the optical disk will be steadily transferred to the rotary pan.

A further object of the present invention is to provide a disk loading device having the ability to disable the radially clamping force so that when installing the optical disk horizontally, the convenient position of the optical disk may be restored.

BRIEF DESCRIPTION OF THE DRAWINGS

The invention, as well as its many advantages, may be further understood by the following description and drawings:

FIG. 8 is a top view of the base of the optical disk loading means in the prior art;

DETAILED DESCRIPTION OF THE PREFERRED EMBODIMENT

Figure 1:
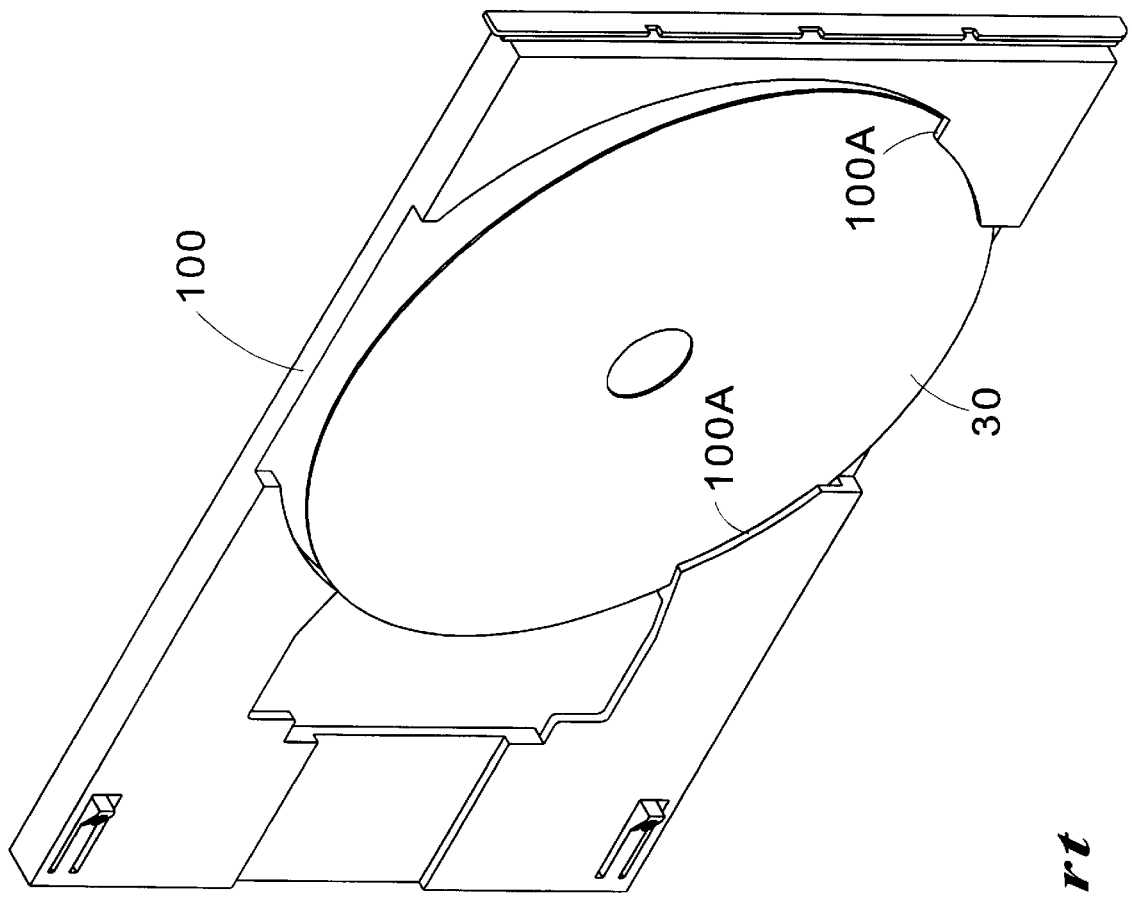
FIG. 1 is a perspective view of a vertically (upright in one side) installing typical optical disk tray of the prior art.
Figure 2:
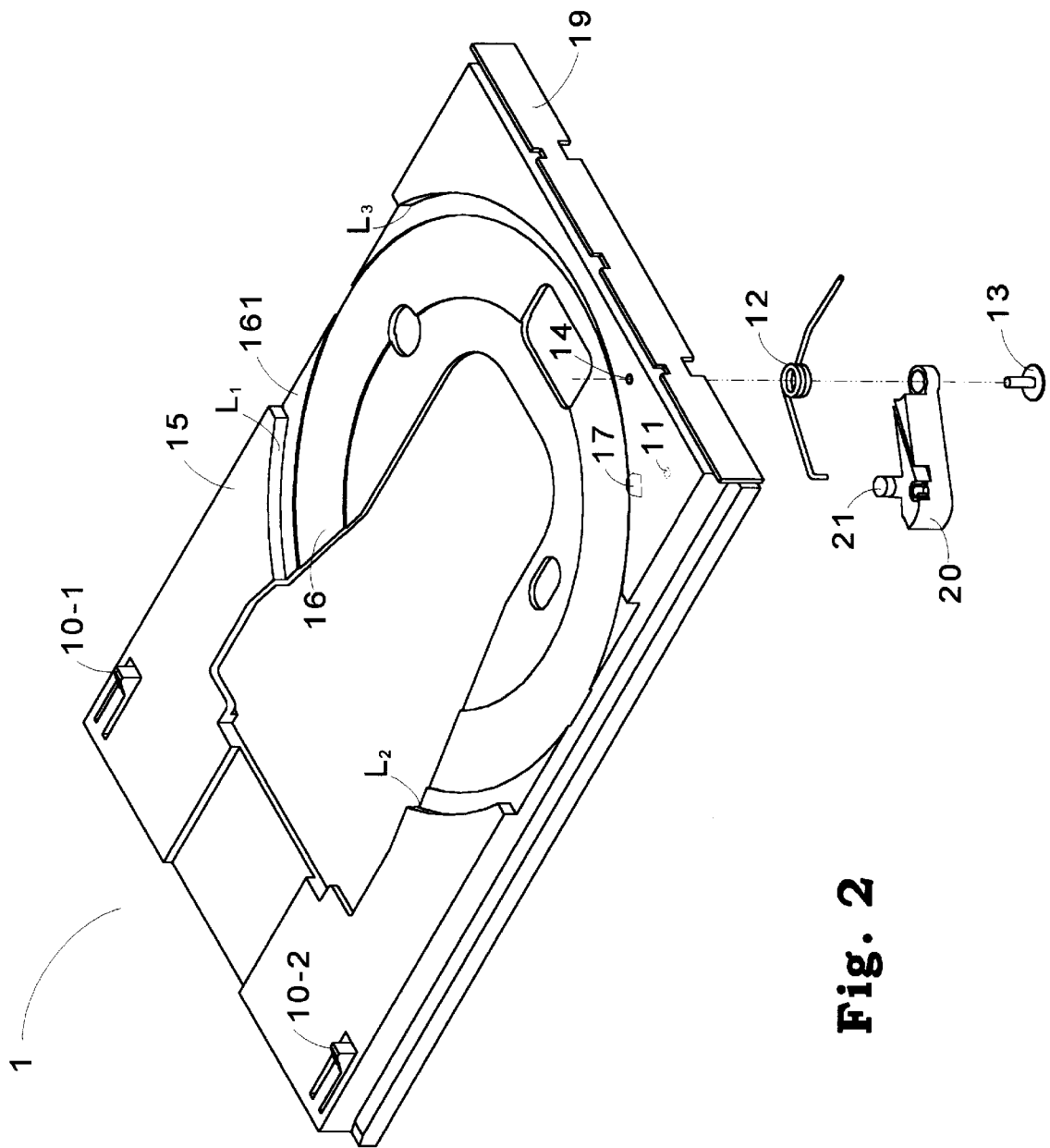
FIG. 2 is an exploded perspective view of the optical disk tray of the present invention.

Reference is now made to FIG. 2, which shows an exploded perspective view of an optical disk tray of the present invention. The optical disk tray 1 of the present invention comprises a first surface 15 and a second surface 16, wherein step walls $L_1$, $L_2$ and $L_3$, and carrying surface 161 between said two surfaces form a drop. The forward tab end 19 of the tray 1 is positioned in the same direction as the tab surface of the optical disk driver, while two stoppers 10-1 and 10-2 are arranged on the first surface 15 near another end of the forward tab end 19. In the optical disk tray of the prior art, the carrying surface 161 is located on the surface which contacts with the surface of the optical disk without data recorded thereon in the optical disk positioning area, thereby preventing the data recorded surface of said optical disk from contacting directly with the second surface 16. The second surface 16 of the tray 1 is used for placing the optical disk, and the area formed by said step walls $L_1$, $L_2$, and $L_3$ is slightly larger than that of the optical disk in order to ensure that when the optical disk is rotated on the rotary pan, the rim thereof will not be interfered with by the step walls $L_1$, $L_2$ and $L_3$ which are orthogonal to said first surface 15 and carrying surface 161, and the structure of said optical disk tray is the same as that of conventional optical disk tray. Additionally, the curved radius of at least one of said step walls $L_1$ forms an arc shape the same as that of the rim of the optical disk.

The optical disk tray of the present invention further comprises a clamping means for providing a radial clamping force onto the rim of the optical disk so as to fix said optical disk in the optical disk positioning area and to make said optical disk vertically loaded into the optical disk driver (upright in one side). Said clamping means comprises a clamping arm 20, a twisting spring 12, a screw 13 and a first pillar 11. After said clamping arm 20 and said twisting spring 12 are combined, they are locked into a screw hole 14 on the back of the tray 1 by said screw 13. The screw 13 is axially connected with said clamping arm 20 so that the rotating movement of said clamping arm 20 will be unaffected, and the clamping portion 21 penetrates said second surface 16 and extends upwards to a notch 17 formed on said step wall L3.

Figure 3:
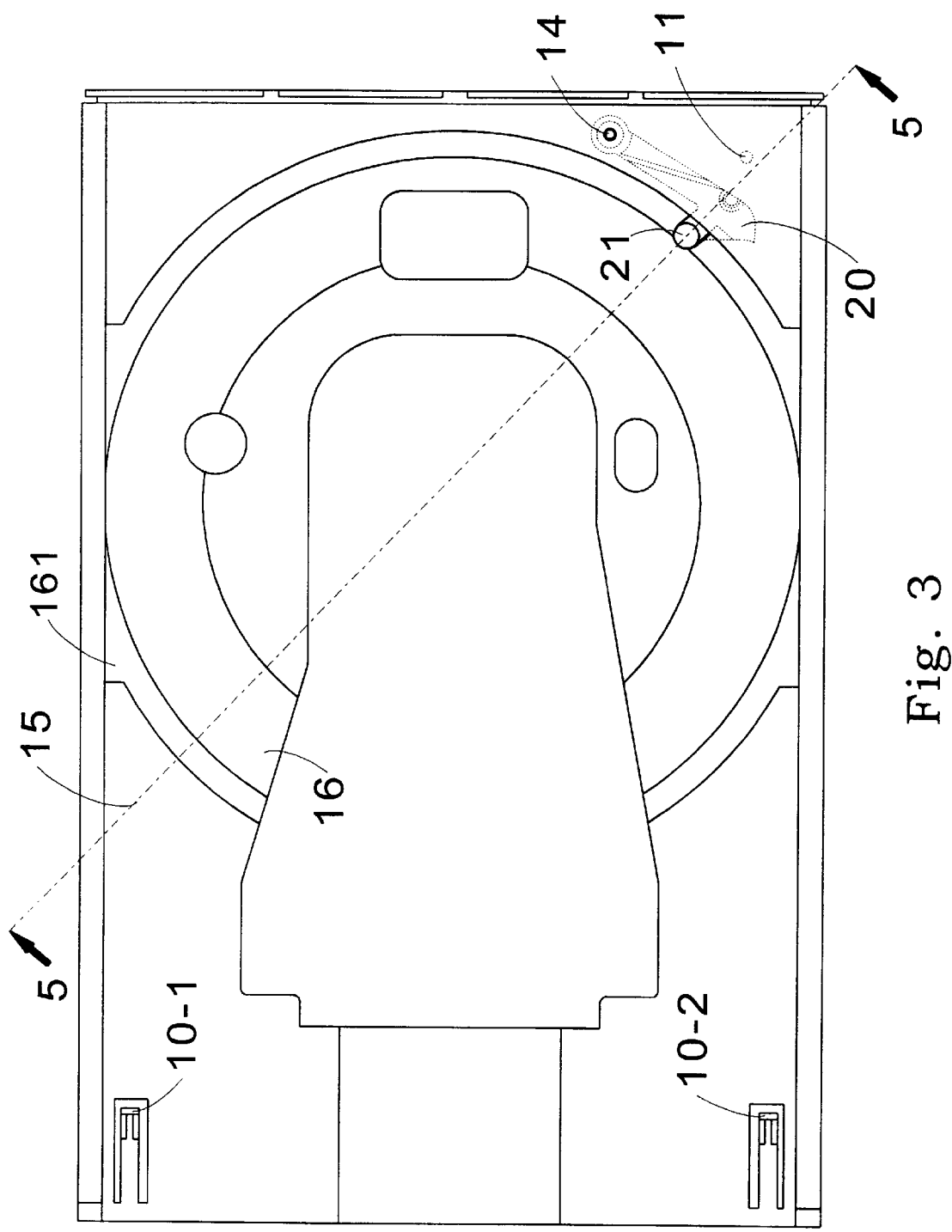
FIG. 3 is a top view of the optical disk tray of the present invention.
Figure 4:
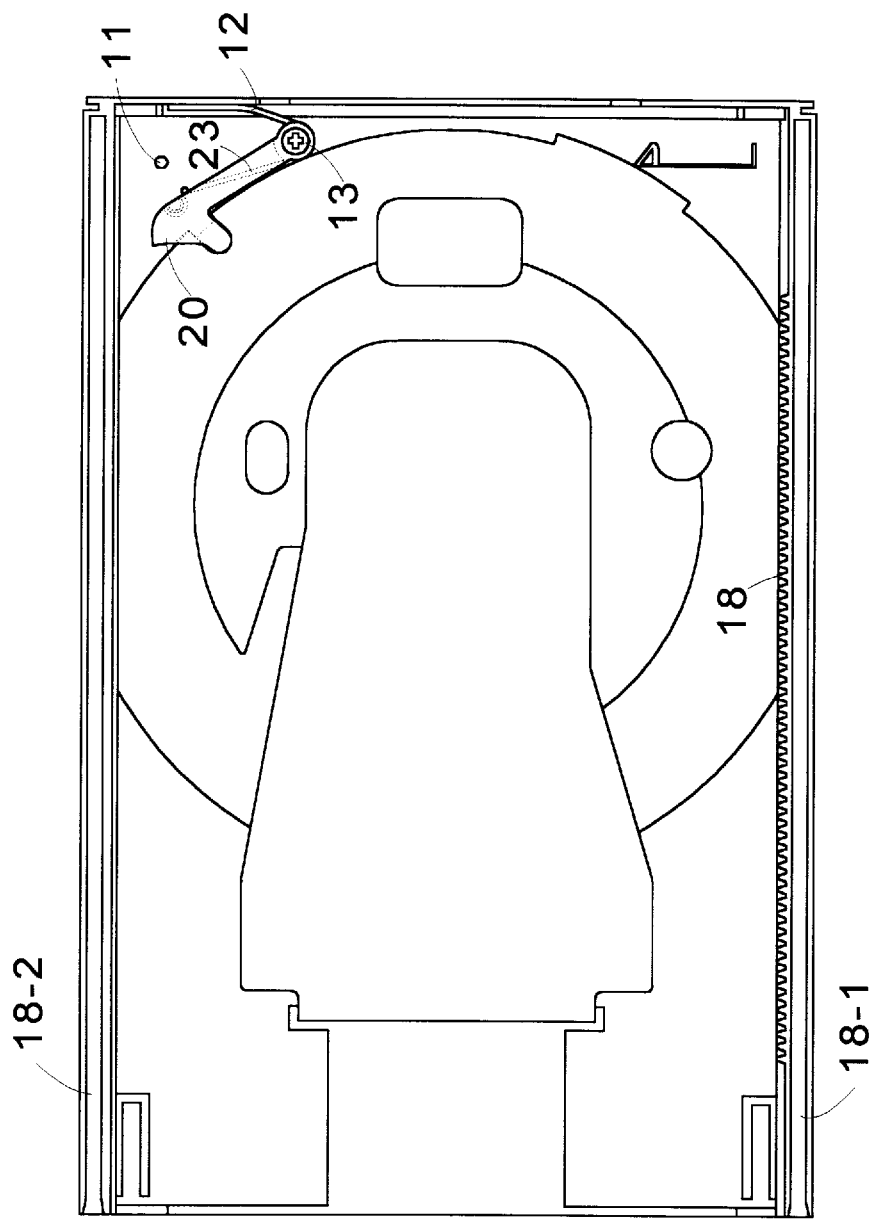
FIG. 4 is a elevational view of the optical disk tray of the present invention.

The top view and elevational view of the present invention is shown in FIGS. 3 and 4. The first pillar 11 is fixed on the surface housing of the tray 1 and has a specific distance apart from said clamping arm 20 so that when said tray 1 enables the function of the clamping means, the clamping arm 20 and the first pillar 11 will not be interfered with and buckled or latched onto each other. When the clamping arm 20 and said twisting spring 12 are fixed on the rear surface housing of the tray 1, one end of the twisting spring 12 is positioned in a slot 23 of the clamping arm 20, and the other end thereof is rested on the inner side wall of the forward tab end 19. When the optical disk is not placed on the tray 1, the clamping portion 21 of the clamping arm 20 extends outward to the optical disk from said notch 17, as shown in the FIGS. 3 and 4. Now referring to FIG. 4 again, a left guiding slot 18-1, a right guiding slot 18-2, and a teeth portion 18 are formed on the rear surface housing of the tray 1. The optical disk tray 1 is driven by a conventional structure to match the driving gear set of the loading system of a base 40 in order to perform the prior loading/unloading operation of the optical disk.

Figure 5:
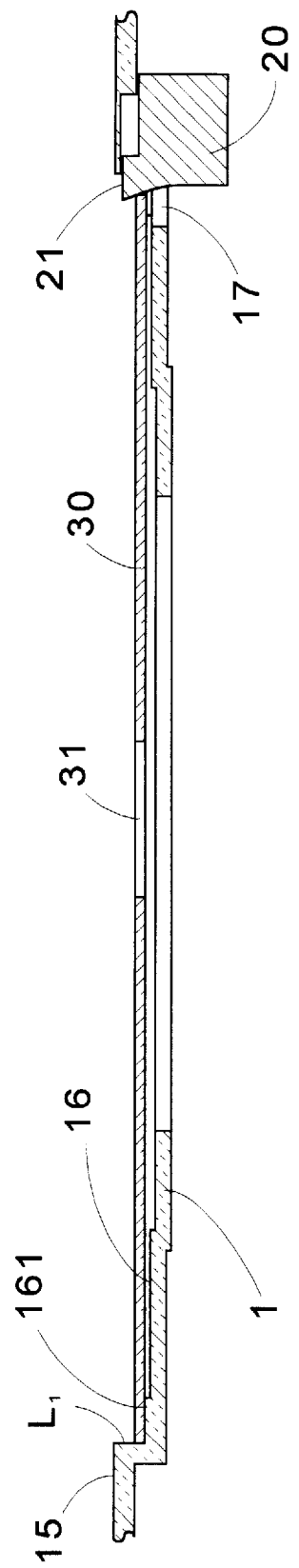
FIG. 5 is a cross sectional view of an optical disk carried on the optical disk tray of the present invention, which is along line 5—5 in FIG. 3.

Referring now to FIG. 5, which is a cross section view of the optical disk 30 carried by the optical disk tray 1 of the present invention along the cross section line 5—5 of FIG. 3, wherein an optical disk in the optical disk positioning area contacts only with a carrying surface 161. Said rim of said optical disk 30 is applied with a radial force by the clamping arm 20 so that the other side thereof rests against the step wall $L_1$, and the clamping arm 20 is slightly withdrawn from the optical disk positioning area, but the clamping portion 21 remains on said positioning area, and said status may be understood from FIG. 9. Further, in another embodiment as shown in the FIG. 5, the clamping portion 21 of said clamping arm 20 may have a tilting cambered surface on the side contacting said optical disk 31 so that when the clamping portion 21 applies a radial force to the optical disk, the optical disk 30 is also tightly pressed to the carrying surface 161. Thus, the optical disk 30 is steadily positioned.

Figure 7:
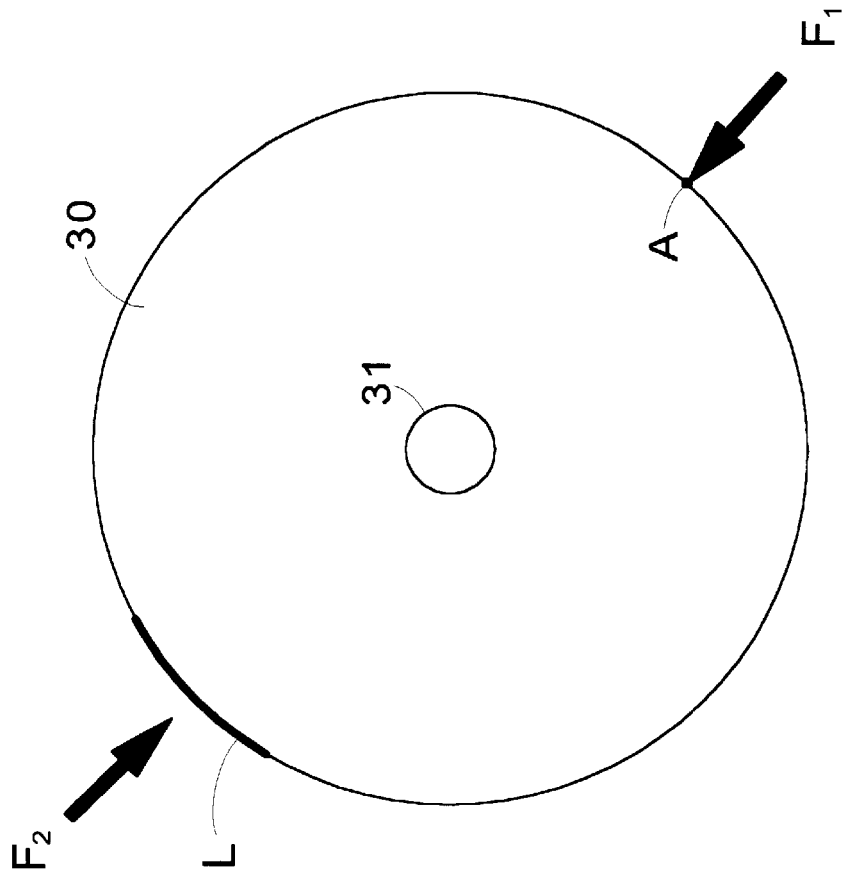
FIG. 7 shows the forces applied on an optical disk and which is used on the optical disk tray of the present invention.
Figure 6A:
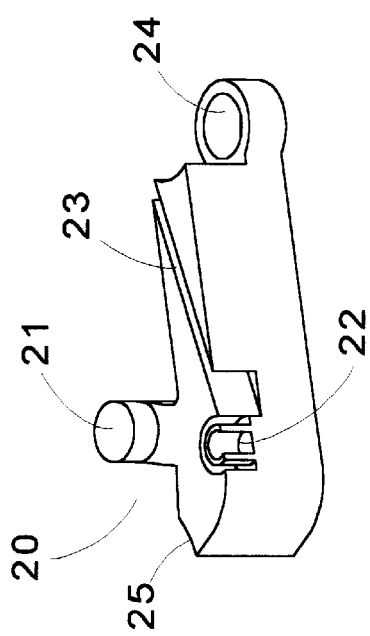
FIG. 6A is a perspective view showing one side of the clamping arm of the optical disk tray in the present invention.
Figure 6B:
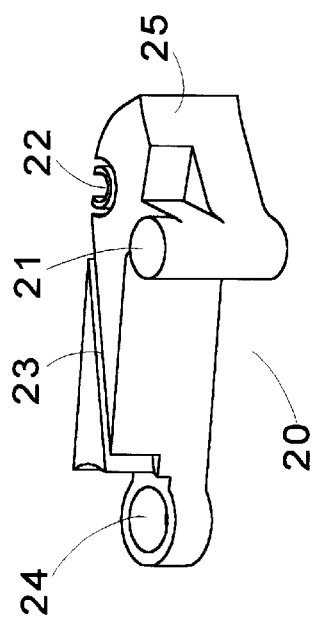
FIG. 6B is a perspective view showing another side of the clamping arm of the optical disk tray in the present invention.

The perspective view of said clamping arm 20 of said clamping means is further shown in the FIG. 6. The clamping arm 20 further forms a clamping portion 21, a flexible mortising slot 22, slot 23, through hole 24 and a tilting surface 25. As shown in FIG. 7, a twisting force is applied on the clamping arm 20 by the twisting spring 12 so that a radial force $F_1$, is applied on the rim of the optical disk by the clamping portion 21. The flexible mortising slot 22 forming a C shape is used to latch the clamping arm to the first pillar 11, when the optical disk driver is installed in the horizontal arrangement. By manually moving the clamping arm 20, the flexible mortising slot 22 thereof is latched to the first pillar 11 so that the clamping arm 20 is fixed, thus the clamping portion 21 is moved out of the notch 17 within the first surface 15 and leaves the positioning area of the tray 1 Therefore, the radial clamping force of said clamping means is disabled. The optical disk 30 is horizontally arranged on the optical disk driver which is horizontally installed as in the prior art. The slot 23 of the clamping portion 20 provides for positioning the one end of twisting spring 12 to steadily combine the clamping arm 20 with the spring 12, and the screw 13 which penetrates the through hole 24 is provided as the rotary axle of the clamping arm 20. When the radial force is enabled by the clamping means, the tilting surface 25 of the clamping arm 20 is used to match the second pillar 45 so that the radial clamping force is disabled. Thus the optical disk is easily loaded into the rotary pan. The enabled condition will be described hereinafter.

Figure 9:
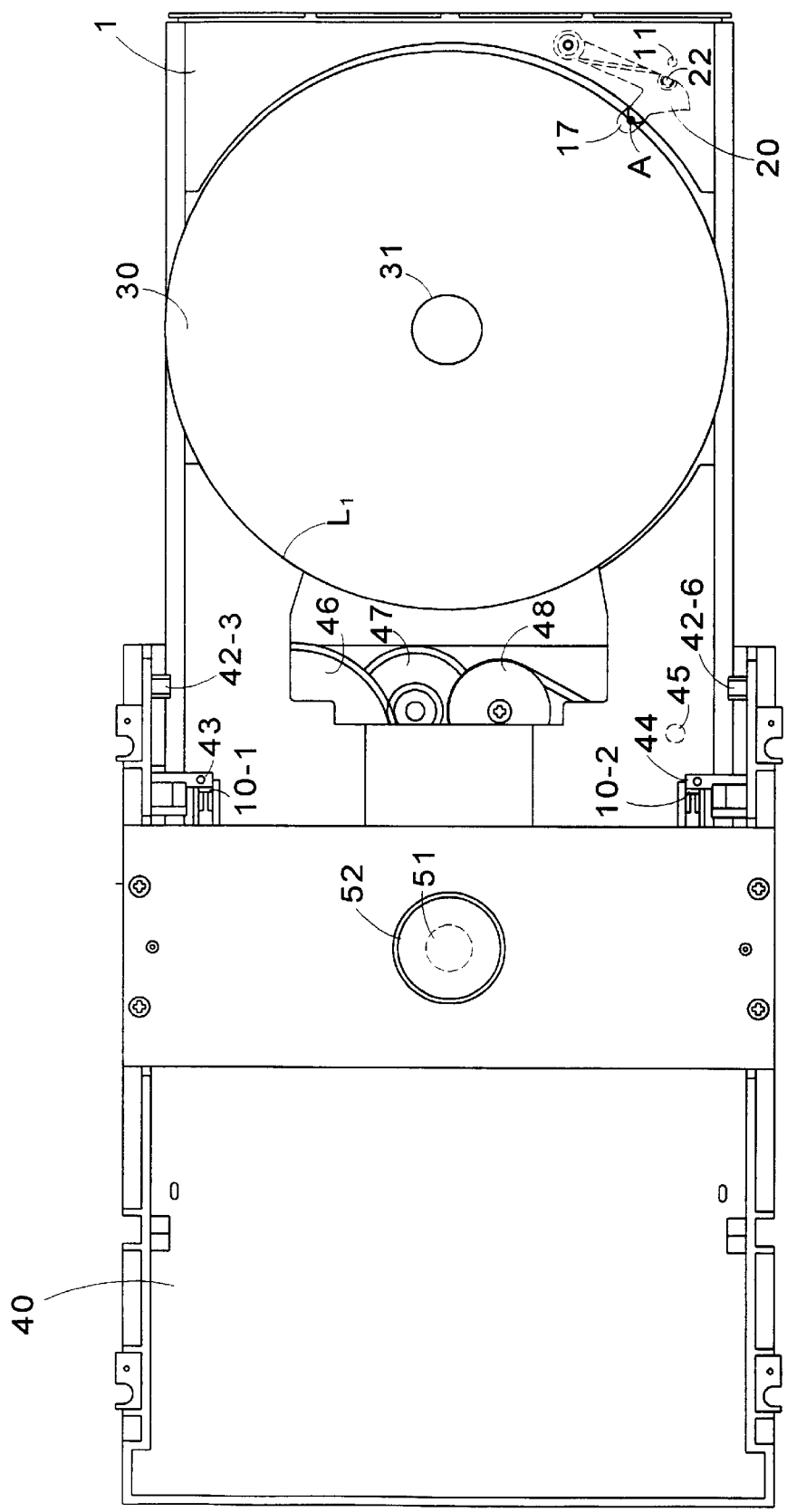
FIG. 9 is a top view of the base of the optical disk tray with a maximum projecting portion during vertical (upright in one side) installation of the present invention.

Referring now to FIGS. 7 and 9. When the optical disk 30 is placed on the optical disk positioning area of the tray 1, the clamping arm 20 pushes the optical disk 30 onto the step wall $L_1$ on the point A which is at the front rim of the clamping portion 21, by the twisting force of the twisting spring 12. As described hereinbefore, as the radial curvature of the step wall $L_1$ is the same as that of the circumference of the optical disk, they both may be tightly engaged. Therefore, when a radial force $F_1$ is applied to the optical disk 30 on the point A by the clamping means, the force will be transmitted through the center of the optical disk 30 so as to generate a uniform reacting force $F_2$ on the step wall $L_1$, thus the rim of the optical disk 30 is tightly adhered to the step wall $L_1$, and the optical disk 30 may be steadily clamped onto the optical disk positioning area of the tray 1 by said radius force $F_1$, and said reacting force $F_2$. As shown in FIG. 7, the acting force $F_1$, and reacting force $F_2$ are applied to the optical disk positioning area of the optical disk 30. In FIG. 7, the wide solid line L represents the rim of the optical disk 30, and a reacting force $F_2$ is applied to the step wall $L_1$.

FIG. 8 shows the elevational view of the base 40 of the conventional optical disk driver, wherein the optical disk tray 1 is omitted. The base 40 of the optical disk driver generally uses optical machine modules, a spindle motor and a conventional optical disk loading and unloading system, and a rotary pan 51 is arranged on the axle of the spindle motor. Left guiding blocks 41-1 to 41-3, right guiding blocks 41-4 to 41-6, left guiding pieces 42-1 to 42-3, and right guiding pieces 42-4 to 42-6 are formed on the housing of the base 40. The structures of said guiding blocks and said guiding pieces can be operated with said left and right guiding slots 18-1 and 18-2, so that the movement of the tray 1 through the optical disk driver is a linear displacement, and left and right stopping bars 44 and 43 are installed in a proper position. A set of driving gears are arranged on the base 40, which comprises a first gear 46, a second gear 47 and a third gear 48, while said three gears are interconnected by the teeth portions 49, as shown in FIG. 8. The gears are driven to rotation by a driving motor 50. The teeth portion 49 of the first gear 46 is interconnected with the teeth portion 18 of the tray 1, so that the tray 1 may input and output the optical disk driver. The present invention further provides a second pillar 45 at a specific position of the base 40 (a fixing body of the optical disk, such as the outer housing). The relation between the second pillar 45 and the clamping means of the tray 1 will be described hereinafter.

Figure 10:
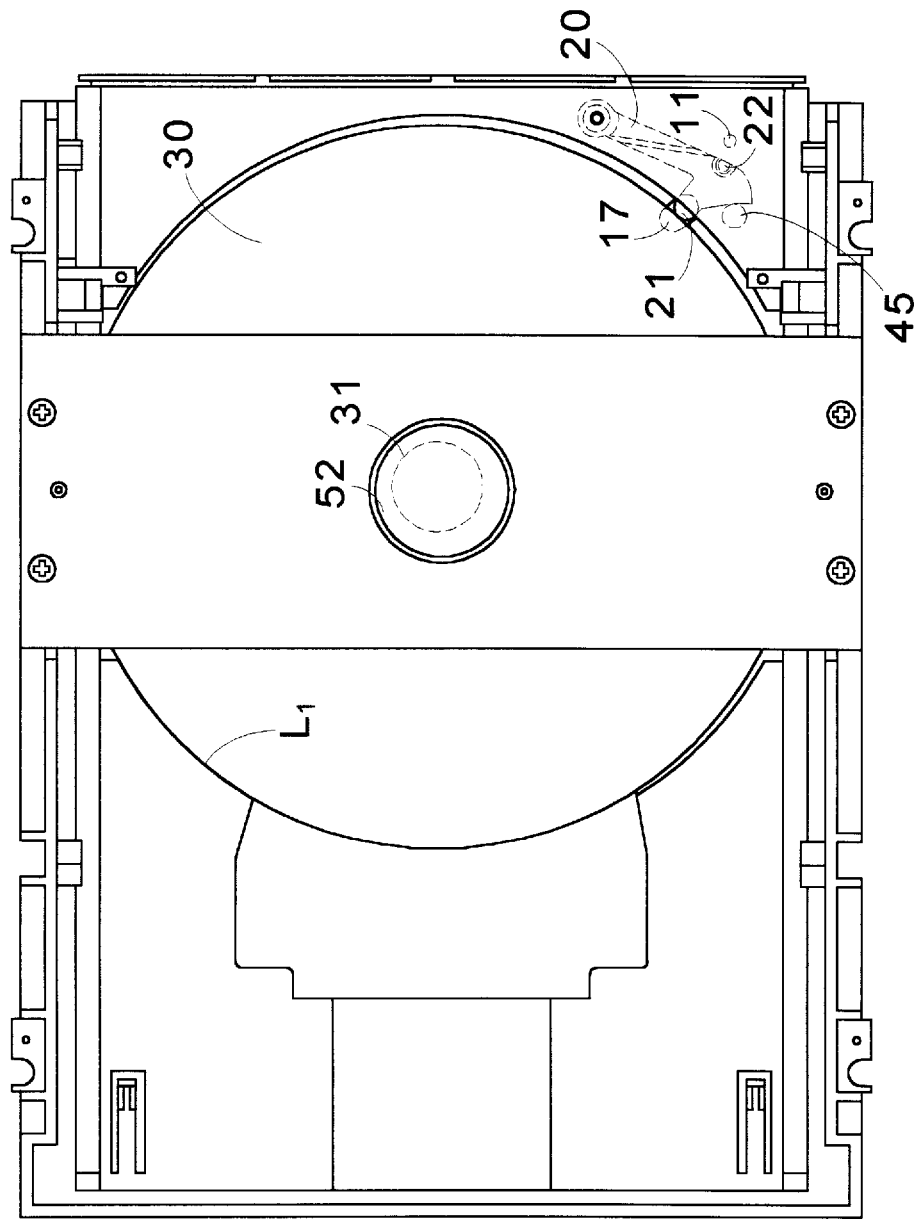
FIG. 10 is a further operating condition of FIG. 9 showing a top view of the first contact condition between the clamping arm of the clamping means and the second pillar of the base during the loading of the optical disk.
Figure 11:
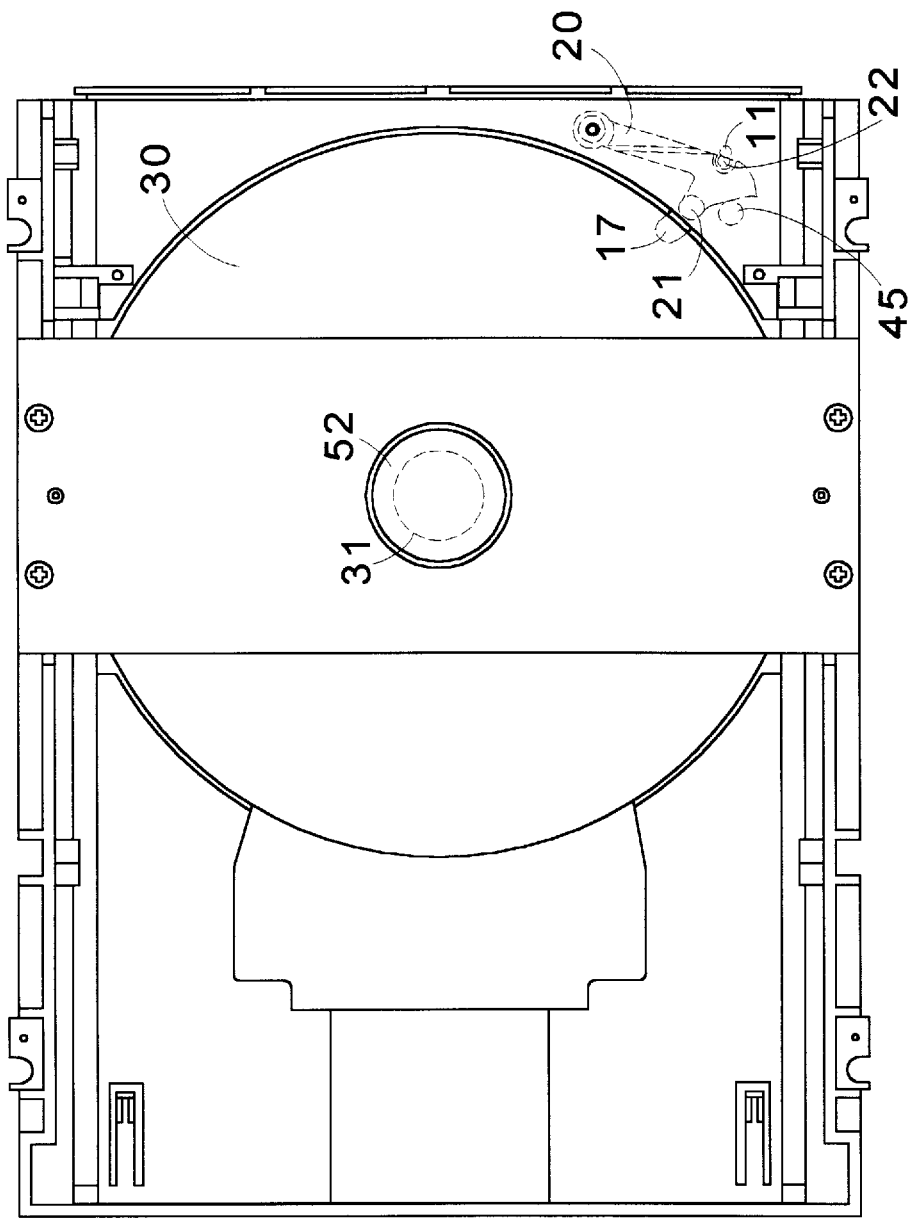
FIG. 11 is a further operating condition of FIG. 10 showing a top view of the optical disk tray of the present invention being positioned on the base, wherein the radial clamping force has been disabled.

Now referring to the subsequent FIGS. 9, 10 and 11. wherein FIG. 9 shows a carrying optical disk driver which is in the maximum extended position mounted on the base 40. Therefore, the left and right stopping portions 10-2, 10-1 and 43 are resisted by the left and right stopping bars 44 and 43, respectively, and the gear portion 49 of the first gear 46 is interconnected with the gear portion 18 of the tray 1. When the optical disk 30 is located by an operator, the clamping arm 20 which is projected from the notch 17 of the clamping portion 21 is pushed away by using the rim of the optical disk 30 (or by hand) for placing said optical disk 30. Then, said front rim A of said clamping portion 21 of the clamping arm 20 will apply a radial clamping force on the optical disk 30 (please refer to the aforementioned description at FIG. 7), thereby shifting the position of the clamping arm 20 to the outside of the step wall $L_3$. Then, as the tray has not borne the optical disk, but the front rim of the clamping portion 21 is still projected from the inside of the step wall L3 (i. e. the optical disk positioning section), and the flexible mortising slot 22 of the clamping arm 20 is apart from the first pillar. When the optical disk is loaded by the optical disk driver, the set of gears is driven by a driving motor 50, and then the tray is put into the optical disk drive by the interconnection of the gear portion 49 of the first gear 46 and the tray 1. During loading, as the optical disk 30 is confined by a radially clamping force on the tray 1, it can steadily move forward to a rotary disk 51 in the direction parallel to the base 40. FIG. 10 shows the relative position as the tilting surface 25 first contacts the second pillar 45. In FIGS. 9 and 10, the relative positions of the clamping arm 20 and the first pillar 11 are the same. When the tray 11 moves continuously, the center hole 31 of the optical disk 30 is also continuously moved toward the rotary disk 51. Because the second pillar 45 is fixed on the base 40, the tilting surface 25 on the clamping arm 20 of clamping means of the tray 1 will contact the second pillar 45 in order that the clamping arm 20 is shifted outward from the stepped wall $L_3$, as shown in FIG. 11. When the tray 1 is completely pushed into the base 40, the front rim of the clamping portion 21 escapes the rim of the optical disk 30 and completely backs away from the optical disk positioning area so as to not interrupt the rotation of the optical disk. Therefore, the optical disk 30 is never confined by the clamping means, but the side surface of the optical disk 30 will be confined by the clamping piece 52, and the lower rim of the optical disk 30 is supported by the step walls $L_2$ and $L_3$ of the tray 1. Thus, the optical disk 30 will not escape the tray 1 and is steadily adhered to the optical disk positioning area. Then, an optical machine module will move nearby the loading position, and the clamp piece 52 will be mutually attracted to the rotary pan 51 so that the optical disk 30 can be fixed on the rotary pan 51, so as to finish the loading of the optical disk, as shown in the FIG. 11. The time for disabling said radial force is almost the same time as that of the optical disk loaded by that for rotary pan 51.

Referring to FIG. 11 continuously, after said optical disk 30 is fixed on the rotary pan 51, the rim of the optical disk 30 will not be interfere with by the step walls $L_1$, $L_2$ and $L_3$ when rotating. Meanwhile, after the tray 1 is loaded into a predetermined position, the relative positions of the second pillar 45, the clamping arm 20 and the first pillar 11 must be taken into consideration. Then, the position of the second pillar 45 as fixed on the base 40 is exactly sufficient for the clamping portion 21 of the clamping arm 20 to be pushed away from the optical disk positioning area, while the position of the clamping arm 20 will ensure that the flexible mortising slot 22 is not latched to the first pillar 11 on the rear surface of the tray 1. That is to say, when the optical disk driver is unloading the optical disk, the radial clamping force applied on the optical disk 30 may still be restored by the clamping arm 20 through the twisting spring.

When the eject button is pushed, the optical disk module is dropped out from the loading position, the rotary pan 51 of the spindle motor is separated form the optical disk 30 and the optical disk 30 is confined by said clamping means so that it can not escape from the tray 1. At the same time, the radial clamping force will be restored by the clamping means in a reverse order respective to said loading process, and will successfully move the tray 1 back to a maximum protrudent distance, as shown in FIG. 9. For the sake of simplicty, the unloading process will be omitted.

Figure 12:
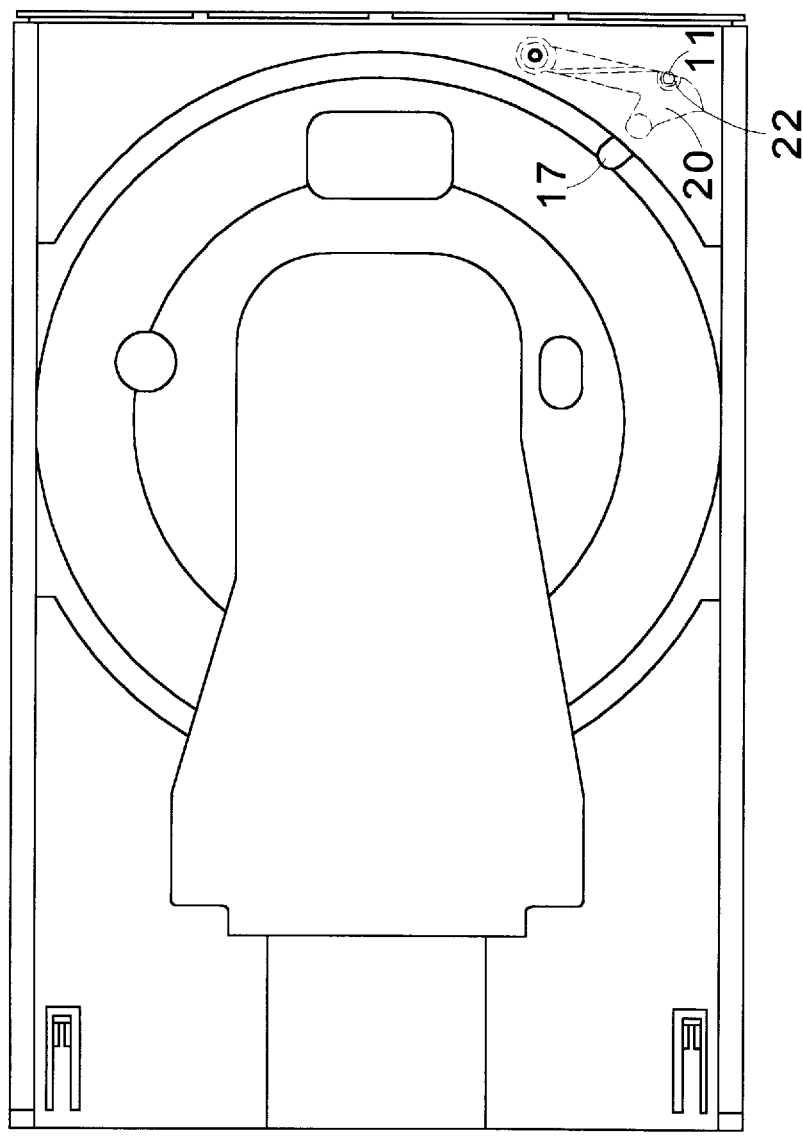
FIG. 12 is a top view showing that the radially clamping force is disabled when the present invention is installed horizontally.

Referring now to FIG. 12, which shows the disabled condition of the clamping means of the tray 1. When an optical disk is horizontally installed, the operator may manually shift the clamping arm 20 toward the pillar 11 until the flexible mortising slot 22 is buckled with the first pillar 11, and said latching condition will not be released by the twisting force of the twisting spring. Therefore, the optical disk tray 1 will load or unload the optical disk by using a conventional method. When an optical disk driver is vertically installed, the user may manually release the latching condition, so as to disable the radially clamping force.

Figure 13:
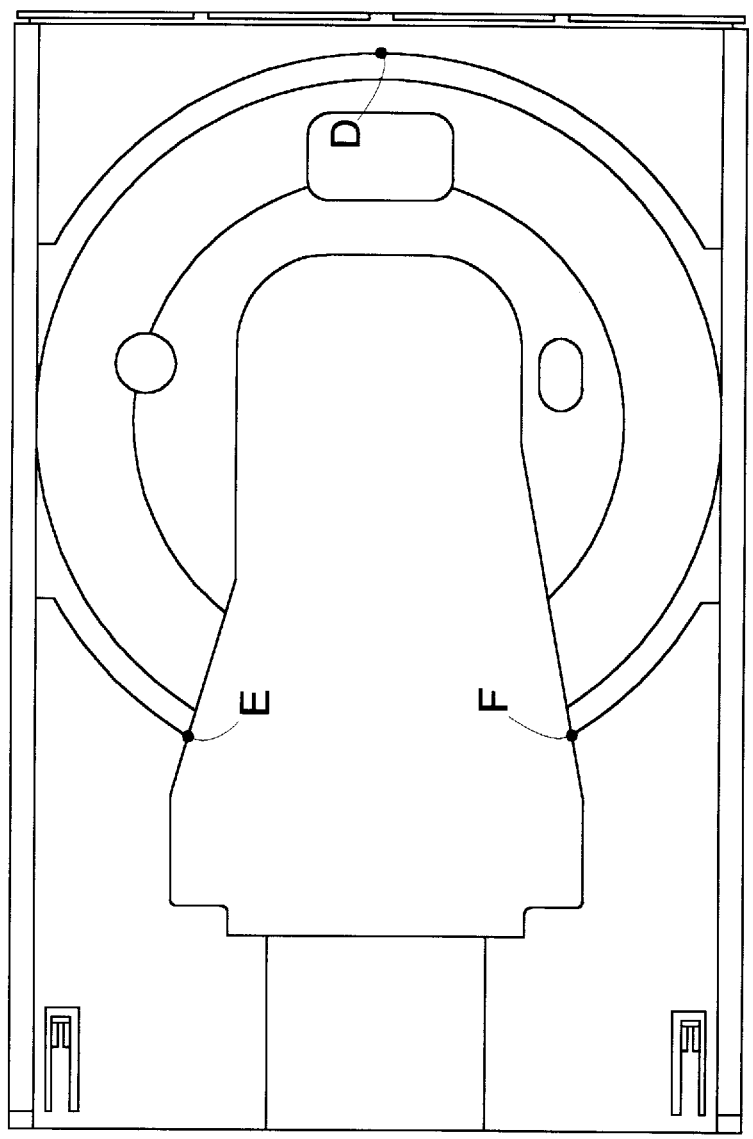
FIG. 13 is another embodiment wherein the optical disk tray has a radial clamping means achieved by a point to point method when the present invention is vertically installed (upright in one side)
Figure 14:
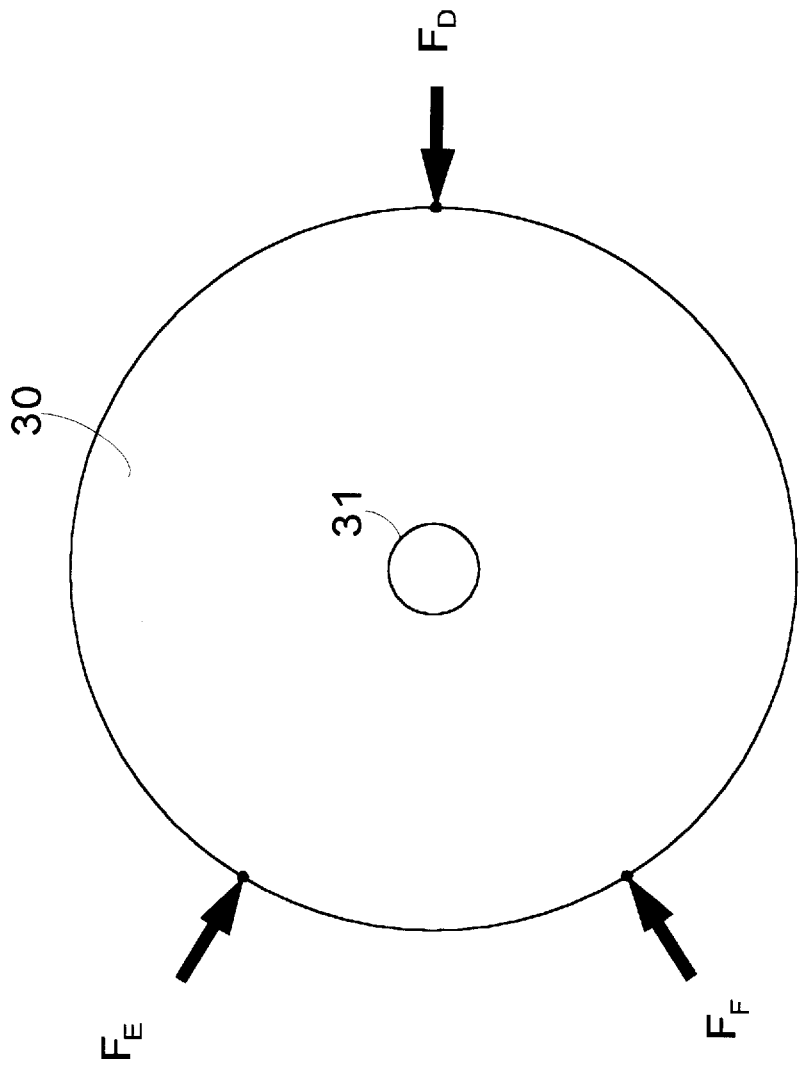
FIG. 14 is a schematic view showing the forces applied on the optical disk and which is used in the optical disk tray of the embodiment of FIG. 13.

In the above embodiment, the optical disk is radially clamped by using a point to surface applied force. In FIG. 13, another clamping method of the tray in the optical disk by point to point applied force is shown. The point to point clamping method means that the force is applied to the optical disk, but does not mean that the force is applied to the two points. When the optical disk is upright, if the force is only applied to two points, the optical disk may be rotated and thus be unsteady. If the optical disk should be clamped steadily, it is necessary to clamp the optical disk at at least three points. In FIG. 14, said clamping arm 20 is arranged on the point D in order that the forces applied to the optical disk 30 are shown in FIG. 14. A radial force $F_D$ is applied to the optical disk 30 at point D and then said optical disk 30 is pushed to the step walls $L_1$ and $L_2$ so that the two reacting forces $F_E$ and $F_F$ are reacted on the points F and E. Therefore, three radial forces are balanced at points D, E and F and thus the optical disk 30 is fixed on the tray, wherein rubber may be adhered on the points E and F for enhancing the reliability of the clamping means.

Furthermore, in another embodiment, when the clamping arm 20 arranged on the point D is at the clamping portion with a cambered surface, a radial force with "surface" type may be applied to the optical disk and the optical disk still derives a reacting force $F_E$ and $F_F$ at points E and F, respectively. Therefore, a surface to point radial clamping may be performed. The radius of the curvature of said cambered surface of said clamping portion may be the same as the rim of the optical disk so that they can be tightly contacted.

Figure 15:
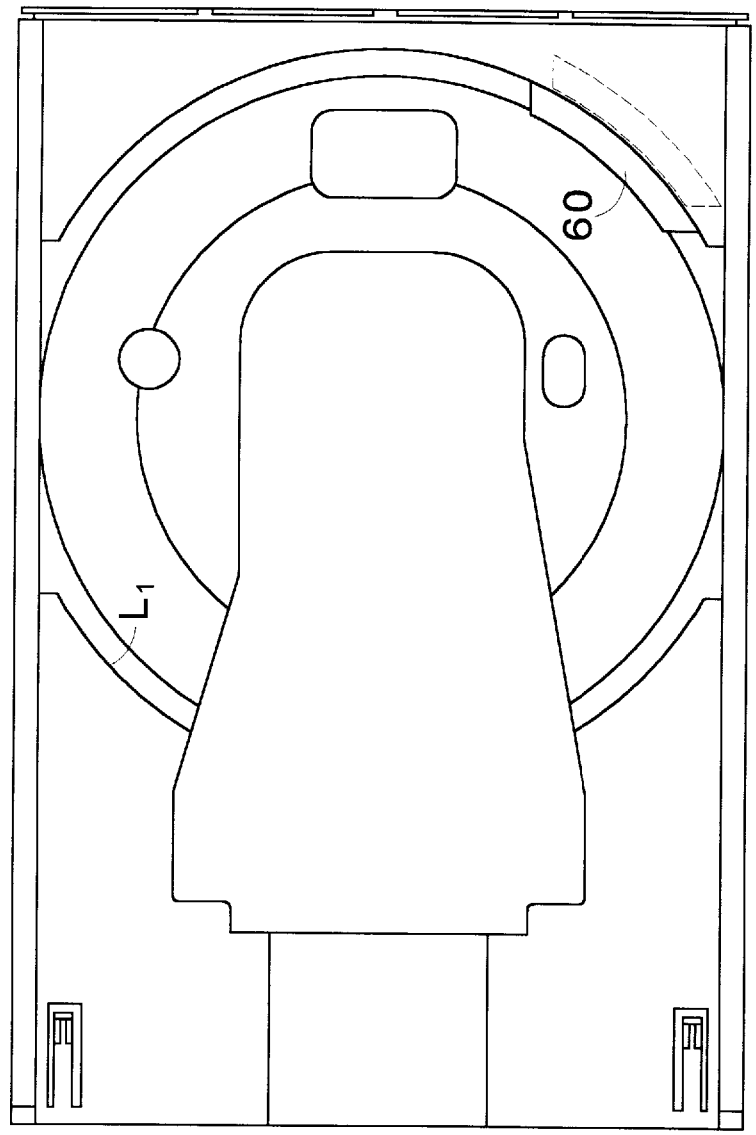
FIG. 15 is a further embodiment wherein the optical disk tray has a radial clamping means achieved by a face to face method when the present invention is vertically installed (upright in one side)
Figure 16:
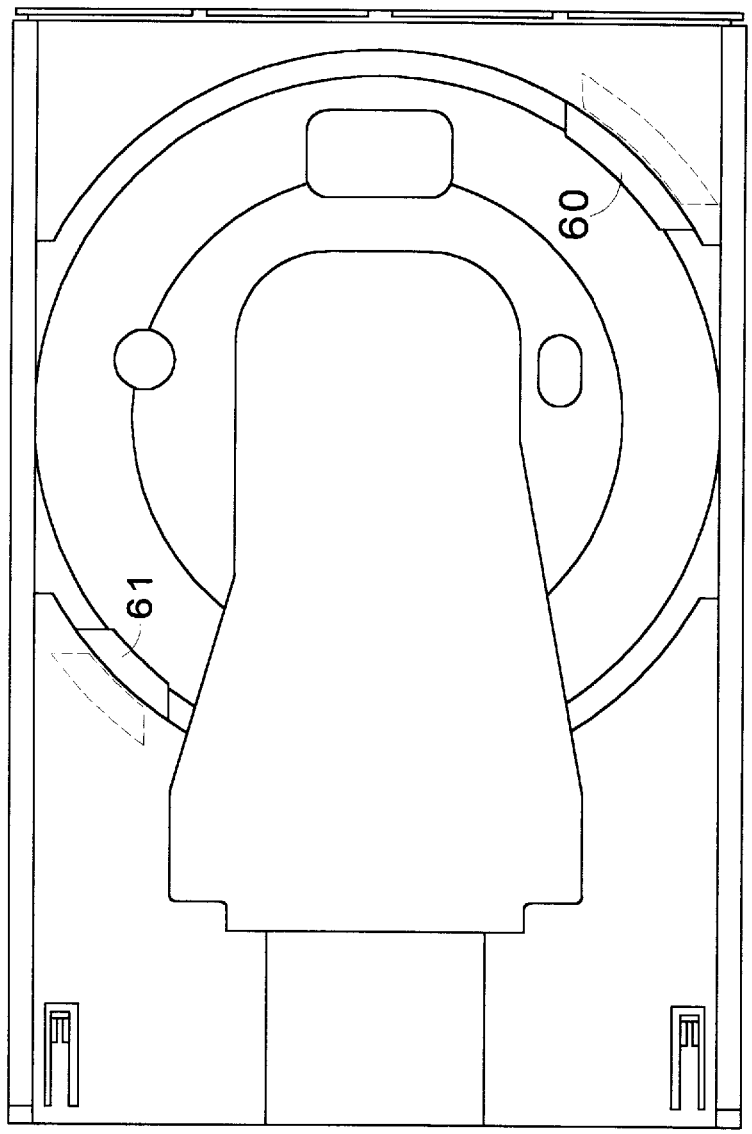
FIG. 16 is another embodiment showing that the optical disk tray has two clamping means when the present invention is vertically installed (upright in one side)

Additionally, the radial force may be applied using a surface to surface method. Referring now to FIG. 15, the radial clamping of the tray 1 may be substituted by the clamping means 60 of cambered surface. When the optical disk is placed on the tray, a radial acting force may be applied thereto by a surface of the cambered surface clamping means. This is an embodiment of radial clamping by acting and reacting forces. Referring to FIG. 16, two or more than two radial clamping means are arranged in a proper position of the tray 1. In FIG. 16, the radial means 60 and 61 may apply radial acting forces to the optical disk simultaneously to clamp the optical disk. This is an embodiment of radial clamping by using mutually cancelled acting forces. Similarly, the radius of curvature of said optical disk is not confined by the above embodiment and the surface thereof may be treated by rubber for improving the reliability of the clamping means.

Figure 17:
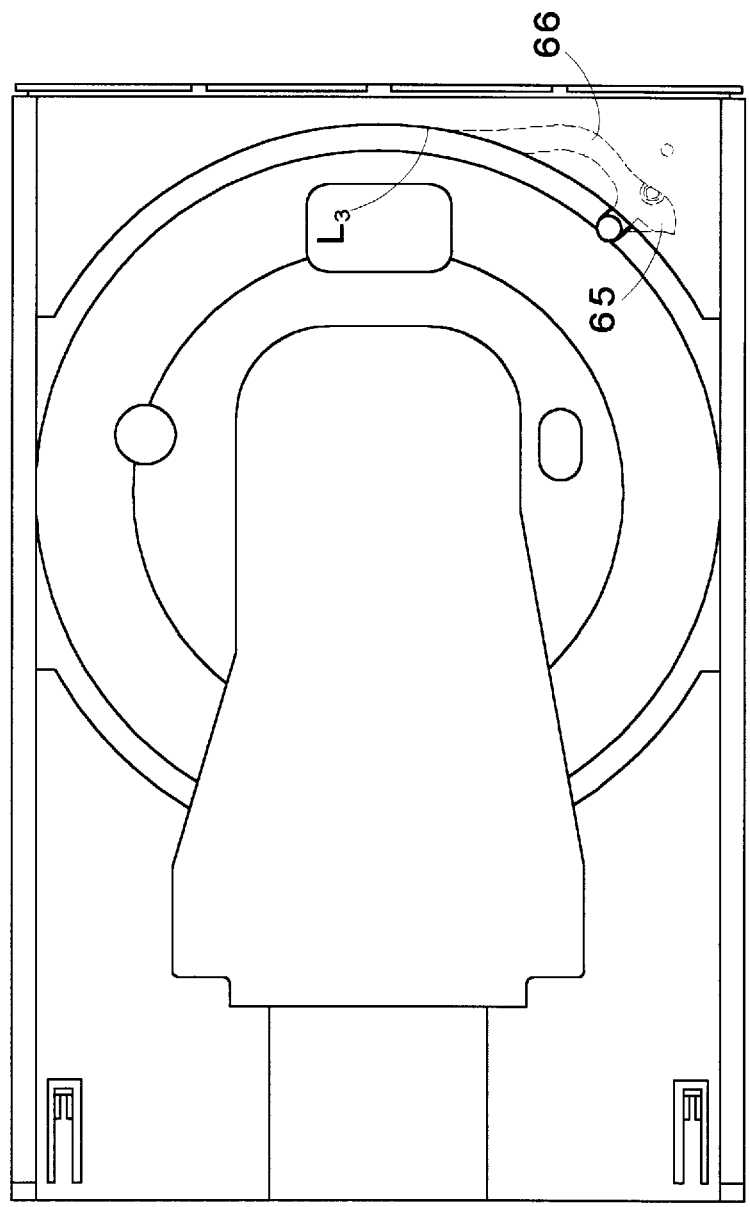
FIG. 17 is another embodiment showing that the clamping arm is formed on the step wall of the optical disk tray when the present invention is vertically installed (upright in one side)

In addition to the different clamping methods shown in the above embodiments, another embodiment is shown in FIG. 17. A clamping arm 65 having a flexing portion 66 is directly formed on step wall $L_3$ of said tray 1.

This clamping method may provide a point to surface radial clamping method as shown in the above embodiment.

Results of the present invention

The disk loading means according to the present invention will make the optical disk driver being installed horizontally or vertically, thus the appended worth of the optical disk is increased and the market competition ability is also promoted. In the loading means of the present invention, when the optical disk driver is vertically installed, the radius force thereof is at least applied to the two opposite rims of the optical disk so as to fix said optical disk so that when the optical disk moves into or withdraws from the optical disk driver along a parallel direction to the base. When the optical disk is parallels arranged, the operator may manually disable the radial force, and the clamping means of the tray restores the conventional loading action.

While this invention has been described in detail with reference to its preferred embodiments, it should be appreciated that the present invention is not limited thereto. Rather, in view of the present disclosure, they would present themself to those skillful in the art without departing from the scope and spirit of this invention. Accordingly, the invention is disclosed and is intended to be limited only by the scope of the appended claims.

We claim:

1. A tray arrangement for loading and ejecting a disk into and out of a disk drive, comprising:

a step wall structure defining a positioning area for receiving the disk;

a clamping means mounted on a circumference of said positioning area for urging the disk against the step wall structure in order to hold the disk during loading and unloading of the disk drive, said clamping means including a clamping arm arranged to engage the disk, an elastic device arranged to urge said clamping arm against the disk, and a flexible mortising slot; and a pillar fixed to said tray at a predetermined position corresponding to a position of said flexible mortising slot when said clamping arm is disengaged from the disk, said flexible mortising slot being arranged to latch said clamping arm in said disengaged position when said mortising slot is pushed against said pillar until said pillar is positioned within said flexible mortising slot, said mortising slot is disengaged from said pillar when the disk drive is in a vertical position to enable said clamping means to engage the disk and hold it during loading and unloading, and said mortising slot is pushed against said pillar to latch said clamping arrangement when the disk drive is in a horizontal position, so that the clamping arrangement will not engage said disk during loading and unloading, and so that the clamping arrangement not interfere with loading and unloading of the disk.

2. An arrangement as claimed in claim 1, wherein a second pillar is mounted at a predetermined position in the disk drive and arranged to move said clamping arm away from the disk as said tray is loaded into the disk drive, thereby allowing free rotation of the disk after loading.

* * * * *